Nov. 8, 1966 J. D. KING ET AL 3,283,569
METHOD AND APPARATUS FOR INDICATING PERFORMANCE CHARACTERISTICS
OF RECIPROCATING PISTON MACHINES
Filed Dec. 21, 1964 5 Sheets-Sheet 1
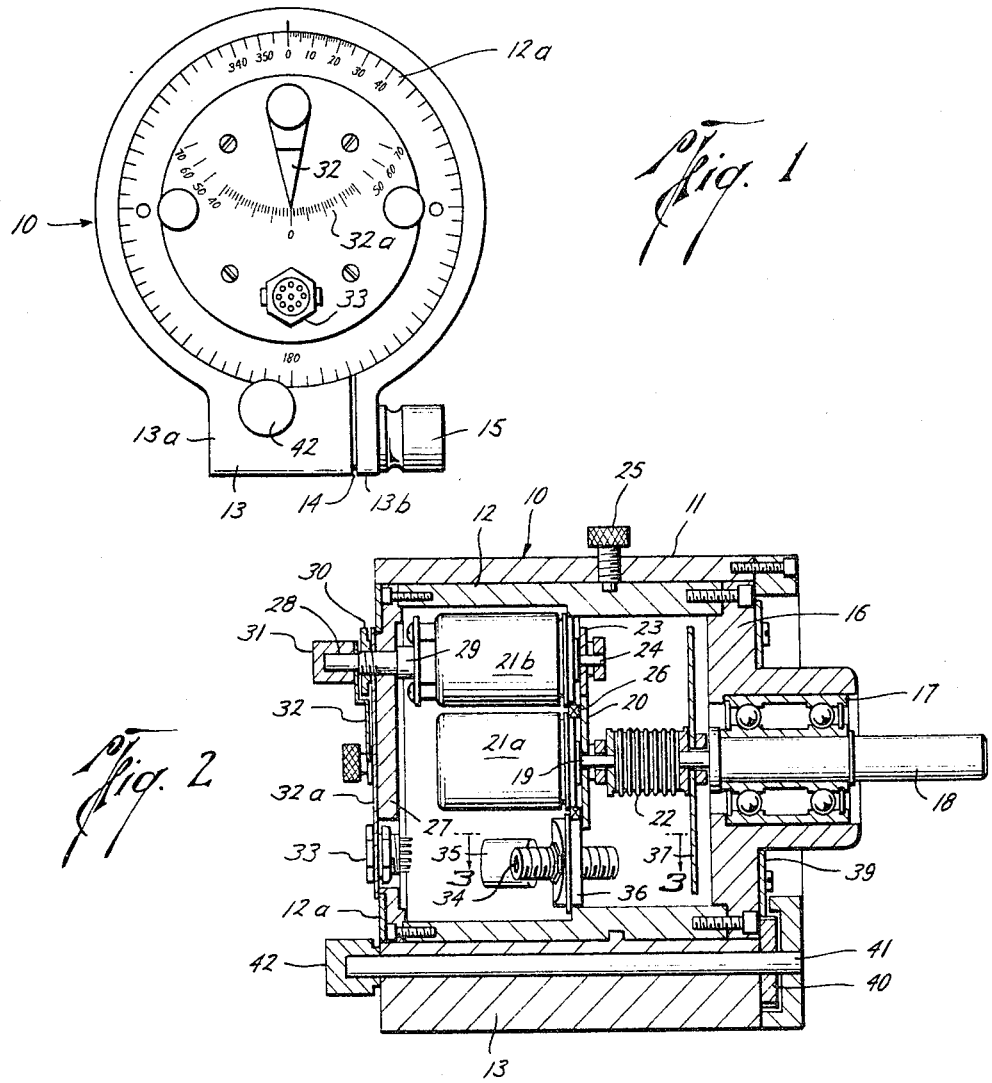
James D. King
Carl E. Edlund
INVENTORS
BY
ATTORNEYS James D. King
Carl E. Edlund
INVENTORS James D. King
Carl E. Edlund
INVENTORS

ATTORNEYS

Nov. 8, 1966

J. D. KING ET AL 3,283,569

METHOD AND APPARATUS FOR INDICATING PERFORMANCE CHARACTERISTICS
OF RECIPROCATING PISTON MACHINES

Filed Dec. 21, 1964

James D. King
Carl E. Edlund
INVENTORS

BY
Browning, Simmons, Hyer & Eichenroht
ATTORNEYS

United States Patent Office 3,283,569
Patented Nov. 8, 1966

3,283,569
METHOD AND APPARATUS FOR INDICATING PERFORMANCE CHARACTERISTICS OF RECIPROCATING PISTON MACHINES
James D. King and Carl E. Edlund, San Antonio, Tex., assignors, by mesne assignments, to Southern Gas Association, Dallas, Tex.
Filed Dec. 21, 1964, Ser. No. 423,630
21 Claims. (Cl. 73—116)

This application is a continuation-in-part of our co-pending application Serial No. 368,039, filed May 18, 1964 (now abandoned).

This invention relates generally to methods and apparatus for indicating certain performance characteristics of machines having one or more cylinders with pistons reciprocating therein, such as internal combustion engines, compressors, etc. This invention relates to apparatus and method for measuring the indicated power of a reciprocating piston machine. In another of its aspects, this invention relates to apparatus and method for graphically presenting the relationship of the pressure in the cylinder to the cylinder volume. In another aspect, this invention relates to apparatus and method for indicating the capacity of a reciprocating piston type of compressor. And in yet another aspect, this invention relates to apparatus and method for determining the power loss occurring in the valves and piping in and around the cylinder.

To measure and indicate the various engine characteristics set out in the preceding paragraph, and to do so electrically and accurately, it is necessary to provide an electrical signal whose amplitude bears an accurate relationship to the swept volume of the cylinder, the "swept volume" being the volume change produced in the cylinder by the moving piston.

For example, the indicated horsepower of an internal combustion engine or a reciprocating piston type of compressor, can be determined by multiplying the area of the P-V card obtained from each cylinder by the shaft speed. This can be done because the area of the P-V card is proportional to the work produced per stroke of the piston and power is the amount of work per unit time. Therefore, the area enclosed by the P-V card multiplied by the number of cycles per unit of time is equivalent to power and may be indicated in terms of horsepower by use of the proper constants.

As is well known, the area of the P-V card can be expressed mathematically by the following equation:

$$A = \oint p \, dV$$

Thus, if an electrical signal could be obtained whose amplitude is proportional to the instantaneous pressure ($p$) in the cylinder, and an electrical signal could be obtained whose amplitude is proportional to the first derivative of the instantaneous volume ($dV$) of the cylinder, these two signals could be multiplied together and integrated, and an electrical signal obtained which would be proportional to the area of the P-V card. Then by adjusting this electrical signal to account for the speed of the crankshaft, a signal proportional to the power output of the cylinder would be produced.

Usually, an electrical signal whose amplitude is an accurate representation of the instantaneous pressure in the cylinder can be obtained without too much difficulty. For example, a pressure transducer can be connected to the cylinder and an electrical signal obtained which is proportional to the actual pressure existing in the cylinder above the piston.

An accurate representation of the instantaneous volume of the cylinder, however, is not so easily obtained. Usually the piston is connected to the crankshaft through a connecting rod which results in the piston moving in the cylinder at a varying speed. Thus the volume in the cylinder above the piston does not change at a constant rate.

It is an object of this invention to provide a method of, and apparatus for, producing an electrical signal having an amplitude which is proportional to the first derivative with respect to time of the instantaneous swept volume of the cylinder, and a method of and apparatus for combining this signal with electrical signals proportional to selected pressures in the cylinder to determine the indicated horsepower of the cylinder, the capacity of the cylinder in the case of a compressor, or the power losses which occur through the valves and piping associated with the cylinder.

It is another object of this invention to provide a method of, and apparatus for, producing an electrical signal which is proportional to the instantaneous swept volume of the cylinder, which signal can be used to present an accurate pictorial presentation on an oscilloscope of the instantaneous volume within the cylinder.

As will be explained more fully below, the actual motion of a piston connected to a crankshaft by connecting rod, may be represented by the sum of a sinusoidal fundamental component having a frequency equal to the shaft rotational speed and even order harmonic components of this fundamental component.

Therefore, it is another object of this invention to provide apparatus for and a method of producing such sinusoidal electrical signal components which, when properly combined, will provide an electrical signal which varies in proportion to the first derivative with respect to time of the instantaneous volume of the cylinder.

Other objects, features and advantages of this invention will be apparent to one skilled in the art from consideration of the description herein, the attached drawings and appended claims.

In actual reciprocating engines and compressors, the volume does not vary in a true sinusoidal manner due to the finite length of the connecting rod. An analysis of the actual motion of the piston shows it to be of a form which may be represented by the sum of the fundamental and even order harmonic components as mentioned above.

In most engines and compressors the ratio of the piston stroke to the length of the connecting rod is such that the coefficients of the higher order harmonics are very small and hence these harmonics can be ignored. For example, in a typical V engine or compressor with an articulating rod and a connecting rod which is five times as long as one-half the piston stroke, it can be shown that the second harmonic is 3.09% of the magnitude of the fundamental and the fourth is .0078%, and the sixth would, of course, be even smaller.

In the use of the connecting rod alone (without an articulating rod), the higher order harmonics are also very small. For example, for a connecting rod which is three times as long as one-half of the piston stroke, the second harmonic is 8.75% of the fundamental, the fourth is .057% and the sixth is .000958%. Where the connecting rod is five times the length of one-half the piston stroke, the second harmonic is 5.05% of the fundamental, the fourth is .13% and the sixth is $6.56 \times 10^{-5}$%.

Of course, the larger the number of even order harmonics combined with the fundamental to produce a resultant electrical signal, the more accurately the latter will represent the actual piston motion. As a practical matter, however, as shown above, the amplitudes of the harmonics above the second are very small, and the actual piston motion can be represented sufficiently accurately for all practical purposes by considering only the fundamental and second harmonic frequencies.

Therefore, in the embodiment of this invention illustrated in the drawings and which will be described below, a first sinusoidal electrical signal (termed the "fundamental" signal) is generated, having a frequency equal to that of the crankshaft rotation, with an amplitude which varies proportionally to the shaft speed and a second sinusoidal electrical signal is generated having a frequency twice that of the crankshaft and hence of the fundamental signal, with the second signal having an amplitude and phase angle, relative to the first signal, such that it represents the second harmonic of the motion of the piston. The amplitude of the second harmonic relative to that of the fundamental can be calculated from known equations. Thus in the last example given above, the amplitude of the second harmonic is equal to 5.05% of that of the fundamental, the amplitude of the latter being a convenient value for the equipment used. Similarly the phase angle mentioned above can be calculated from known equations and adjusted as described below. By properly combining the fundamental and second harmonic signals, a third signal is obtained which is a very accurate representation of the swept volume in the cylinder above the moving piston. Since the "volume" electrical signal thus obtained is the sum of the two time varying sinusoidal signals, the instantaneous amplitudes of which are proportional to the sine of the shaft position when the composite signal is in phase with the shaft (i.e. the signal is at a maximum when the piston is at dead center), a derivative of volume as a function of time $dv/dt$, can be obtained by shifting the phase angle of these first and second electrical signals by 90°, since the derivative of $\sin \theta$ is $\cos \theta$ and then summing them to provide such derivative signal which is of zero amplitude when the piston is at dead center.

In accordance with this invention, the electrical signals described above are obtained with rotary sensor means having output signals proportional to the sine and/or the cosine of the shaft position, which are rotated so that the output of one has the same frequency as the crankshaft and the output of the other has a frequency twice that of the crankshaft. The rotary sensors can be electric resolvers or synchros, which are excited by an A.C. voltage, with a phase sensitive detector to convert the output of the synchros to a voltage replica of the piston position. The amplitude of the output voltage in this case is independent of the shaft speed.

The two desired electrical signals can also be obtained with tachometers which have a permanent magnet rotors or field.

In the preferred embodiment of the invention, the two electrical signals described above are obtained with a rotary shaft transducer comprising two electrical resolvers and adding circuits. The resolvers have a D.C. current exciting either their rotor or field winding to produce a static magnetic field. In this manner, the two resolvers produce output voltages that are proportional to the product of the shaft speed and the sine or cosine of the shaft position. Since the output of the transducer is a function of the shaft speed, as well as the piston position, the necessary additional mathematical operation required to convert the computed work function to a power function is produced. In the case of the rotary sensors excited by A.C. voltage described above, since their output is independent of shaft speed, it is necessary to multiply their output by a signal proportional to shaft speed when using the signal to determine power which is, of course, a function of shaft speed as well as pressure and volume.

The invention will now be described in connection with the attached drawings, in which one embodiment of the invention is illustrated, and in which:

FIG. 1 is a front view of a transducer assembly;

FIG. 2 is a vertical cross sectional view through the transducer assembly of FIG. 1;

FIG. 3 is a view taken along line 3—3 of FIG. 2;

Figure 4:
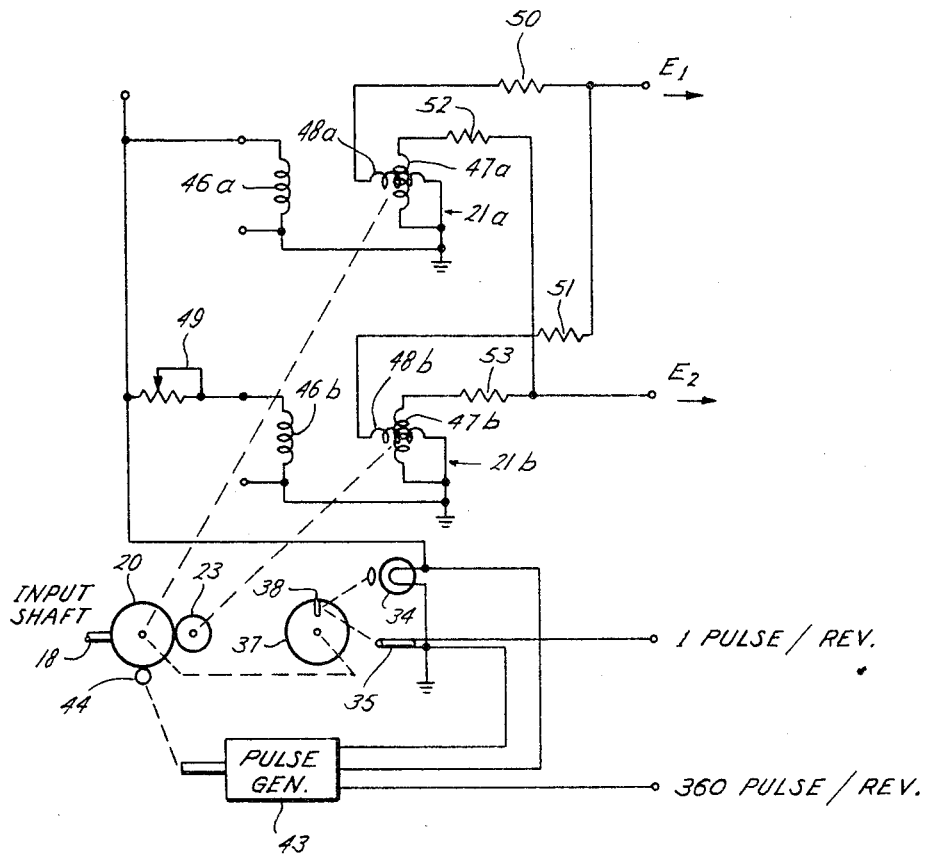
FIG. 4 is an electrical diagram of the transducer assembly of FIG. 1.

In accordance with this invention means are provided to generate two electrical signals, one of which is proportional to the piston motion and the other proportional to the time derivative of the piston motion.

In the embodiment illustrated in the drawings, the two electrical signals are obtained by a transducer generally indicated by the number 10. It comprises an outer cylindrical housing 11 which has an enlarged base 13. The housing is split longitudinally by slot 14 which extends through the base and divides it into two portions 13a and 13b. The base is also provided with a laterally extending opening (not shown) which is tapped in portion 13a to engage the threads (not shown) on clamping screw 15 which extends through the lateral opening. In this way the base portions 13a and 13b can be pulled together or released by tightening and loosening adjusting screw 15 to adjust the inside diameter of housing 11.

Located within housing 11 is inner cylindrical housing 12. The outside diameter of inner housing 12 is preferably such that it can be clamped and held against rotation relative to housing 11 by tightening screw 15 but is free to rotate relative to the outer housing when the screw is loose. This arrangement, as will be explained more fully below, allows the transducer to be adjusted for the proper top dead center position for each of the various cylinders of the engine or the compressor being tested after it has once been synchronized with one of the cylinders.

End plate 16 is arranged to close one end of inner housing member 12 and provide support for rotary bearing 17 which in turn rotatably supports shaft 18 so that the longitudinal axis of the shaft and housing 12 coincide. The shaft extends through end plate 16 into housing 12 and is connected to drive gear 20 and shaft 19 of resolver 21a through flexible drive connection 22. The longitudinal axis of the shaft 19, drive gear 20, and flexible connection 22 also coincide with the longitudinal axis of housing 12. Resolver 21a is mounted within inner housing 12 by partition 26 which extends laterally across the housing.

Also mounted on partition 26 is a second resolver 21b which is also driven by shaft 18 through drive gear 20 which meshes with driven gear 23 mounted on shaft 24. Since in the embodiment illustrated, the output signal of resolver 21b is to be at a frequency equal to the second harmonic of the shaft speed, gear 23 is provided with one-half as many teeth as drive gear 20 so resolver 21b will be driven at twice the speed of resolver 21a.

For convenience, it is contemplated that transducer 10 will be mounted by some appropriate means so that housing 10 will be held stationary while shaft 18 is rotated at the speed of the crankshaft of the machine being tested. Therefore, means are provided for phasing the output of the transducer with the motion of the piston in the cylinder being tested.

In the embodiment illustrated, this is accomplished by allowing inner housing 12 to be rotated within housing 10 as explained above. After the transducer is synchronized with one cylinder, then it can be adjusted for each of the other cylinders by rotating housing 12 through an angle equal to the crank angle between the two cylinders. For this purpose, dial 12a is provided around the outer periphery of end plate 27 which closes the end of housing 12 and the dial is graduated in degrees. To help hold housing 12 in position within housing 10, set screw 25 is provided.

To assist in rotating inner housing 12 and to make fine adjustment of its position easier, gear 39 is attached to end plate 16 to mesh with smaller gear 40 which is mounted on shaft 41 extending longitudinally through an opening provided therefor in base 13. Thus, rotation of shaft 41 will cause rotation of inner housing 12 relative to outer housing 11. Knob 42 is provided to assist in the rotation of the shaft.

There is zero phase angle between the fundamental and second harmonic where the piston is connected to the crankshaft through a connecting rod only. However, so where an articulating rod is driving the piston, the phase angle is not zero. Therefore, means are provided to adjust the output of resolver 21b to have the desired phase angle (which can be readily calculated from known equations) with the output of resolver 21a.

In the embodiment shown, resolver 21b is mounted in partition 26 so its outer housing and field coils can be rotatably adjusted relative to the position of the field coils of resolver 21a. Attached to the resolver housing and extending through end plate 27 is shaft 28. The shaft is provided with a shoulder 29 to engage the inside of end plate 27 and jam nut 30 to releasably engage the outside. The shaft is also equipped with knob 31.

Thus, in the embodiment illustrated, to adjust the phase angle of the output of resolver 21b with respect to the output of resolver 21a, the jam nut is loosened and shaft 28 (and the field coils) rotated the desired number of degrees in the proper direction, after which the jam nut is again tightened to keep the resolver in position. To indicate the phase angle, pointer 32 is attached to shaft 28 and moves along dial 32a located on end plate 27.

Means are also provided for producing one electrical impulse for each rotation of the crankshaft of the engine or compressor. In the embodiment illustrated, a light source 34 and a photoelectric cell 35 are mounted in support member 36 in the manner illustrated in FIG. 3 whereby the longitudinal axis of the light source and the electric cell intersect at a point located on the surface of disc 37, which is mounted for rotation with shaft 18. Disc 37 is provided with a non-reflecting surface so no light from light source 34 will be reflected onto photoelectric cell 35 which is arranged to prevent the flow of electricity as long as it receives no reflected light. Then by making a small portion of the disc reflecting, such as by attaching mirror 38 thereto, light from light source 36 will be reflected onto the photoelectric cell when the mirror passes into the light stream causing an electrical pulse to be passed by the photoelectric cell each time the disc makes one rotation. In this way, one electrical pulse is produced with each rotation of shaft 18, which can be used to indicate the end or beginning of each cycle.

Figure 5:
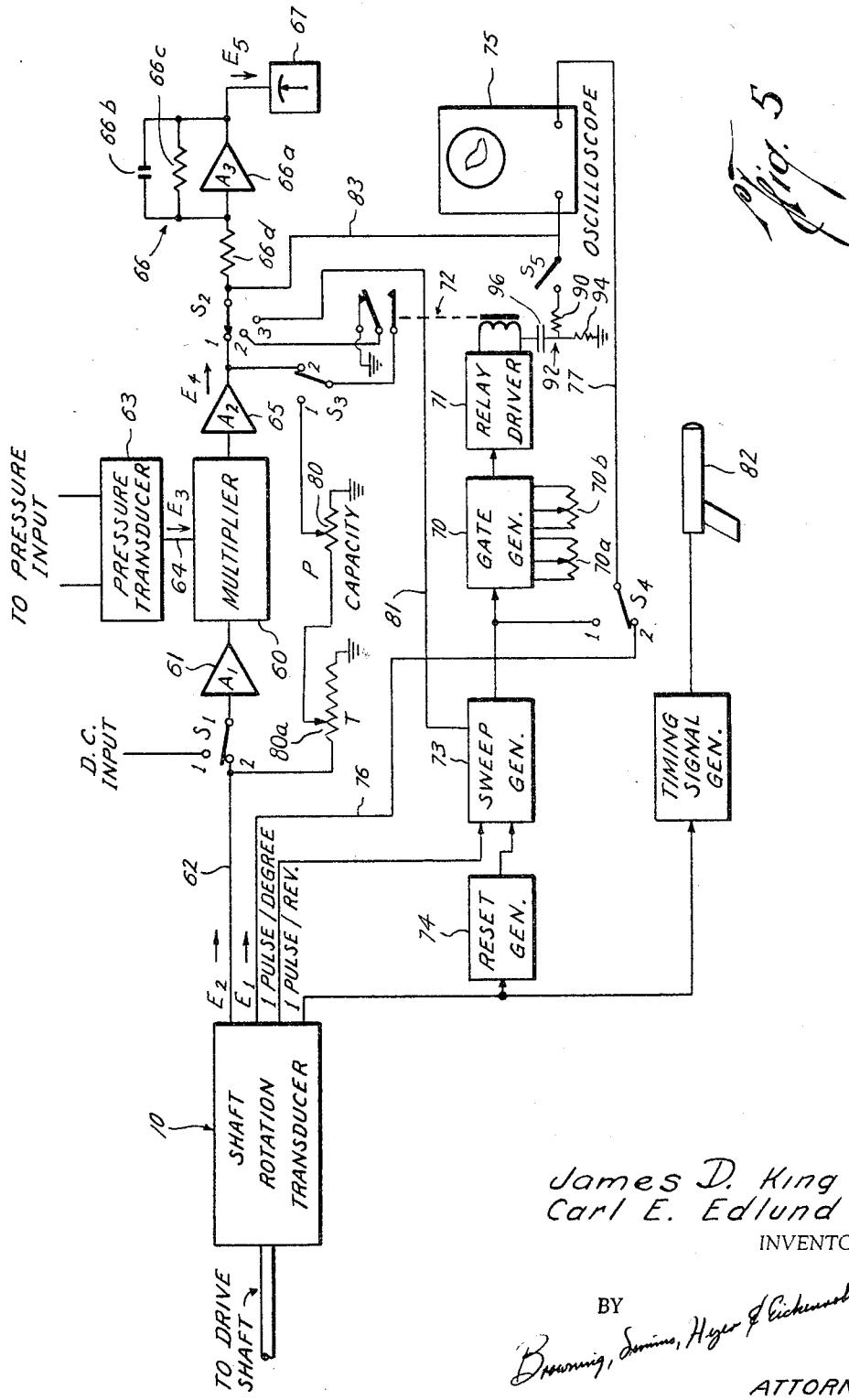
FIG. 5 is a block diagram illustrating an arrangement of the apparatus of this invention for measuring or graphically representing the various characteristics of a reciprocating piston machine.

Also located within inner housing 12 of the transducer, but which is not shown in the drawings except schematically in FIGS. 4 and 5, is a pulse generator 43 which produces 360 pulses per revolution of shaft 18. In one embodiment of the transducer, a pulse generator manufactured by Clifton Precision Products, which produces 60 pulses per revolution is driven at six times the speed of shaft 18 by appropriate gearing 44 to obtain the desired 360 pulses per revolution.

None of the electrical conductors used to connect the various components of the transducer to outlet socket 33 are shown in FIG. 2 since this would serve only to confuse the drawing. It is understood that the appropriate conductors will be provided.

FIG. 4 illustrates the electrical circuitry of transducer 10 with some of the components shown schematically. As explained above, in the preferred embodiment of the invention the two electrical signals are obtained with electrical resolvers having either their field or stator winding supplied with direct current so the instantaneous value of the output voltage amplitude will be proportional to shaft speed as well as to the sine or cosine of the shaft position. In fact the output will be proportional to the product of the two.

In the embodiment shown, direct current is supplied to field windings 46a and 46b of resolvers 21a and 21b. Means are provided to adjust the amplitude of the output of resolver 21b which in this embodiment comprises potentiometer 49.

Each resolver is provided with two rotor windings arranged so that each resolver will generate two signals 90° out of phase. In this way, two signals can be obtained, one of which is proportional to the instantaneous swept volume of the cylinder and one which is proportional to the first derivative with respect to time of the instantaneous swept volume.

Thus, by rotating field winding 46a so that the signal from rotor coil 48a is at a maximum when the reciprocating piston in the cylinder is at dead center, the output from coil 48a will be proportional to the fundamental of the piston motion and its output will also be proportional to the product of the speed of the crankshaft and the sine of the shaft position. Also, by rotating field winding 46b so that the signal from rotor coil 48b is at the proper phase angle with the fundamental signal from coil 48a and by adjusting potentiometer 49 until the signal from coil 48b is at the proper amplitude, its output will be proportional to the second harmonic of the piston motion. By combining this fundamental and second harmonic, as through summing resistors 50 and 51, a signal $E_1$ is obtained which is proportional to the shaft speed and the instantaneous volume of the cylinder.

In this same manner, the outputs of windings 47a and 47b, whose outputs are the same as those of 48a and 48b except that they are 90° out of phase therewith, are combined through summing resistors 52 and 53 to produce a signal $E_2$ which is proportional to the shaft speed and the first derivative of the cylinder volume.

FIG. 5 shows schematically the apparatus which uses these signals, along with the one pulse per revolution and the 360 pulses per revolution which are produced by transducer 10, to measure and graphically present the performance characteristics of a cylinder.

To measure the indicated power of the cylinder, output signal $E_2$ which is proportional to the first derivative with respect to time of the instantaneous volume of the cylinder, $dv/dt$, is connected to multiplier 60 through amplifier 61 by line 62 when switch $S_1$ is in position 2 as shown in the drawing. Multiplier 60, which can be of any conventional design, then multiplies $E_2$ by the signal $E_3$ received from the pressure transducer 63 which provides an electrical signal proportional to the instantaneous pressure in the cylinder and which is connected to the multiplier by line 64. Known types of pressure transducers can be used to perform the pressure sensing function.

$E_4$, the product of $E_2$ and $E_3$, is then transmitted through amplifier 65 to an integrating circuit, generally indicated by the number 66, when switch $S_2$ is in position 1. The integrating circuit comprises amplifier 66a, capacitor 66b, and resistors 66c and 66d and is designed to integrate on a long time base to produce a signal $E_s$ which is proportional to the indicated power of the cylinder. This signal can then be read on meter 67 which can be calibrated in any desired power units.

In many instances, it is desirable, while studying the performance of an engine or compressor, to observe a graphical presentation of the pressure-volume relationship during each cycle of the piston in the cylinder.

To obtain such a graphical presentation, in the embodiment illustrated, oscilloscope 75 is used. Normally the horizontal axis on the P-V diagram represents volume so the deflection plates of the oscilloscope which control the horizontal sweep are connected to transducer 10, through lines 76 and 77, to receive electrical signal $E_1$ which, as explained above, is proportional to the instantaneous volume of the cylinder. Switch $S_4$ is, of course, in position 2.

To obtain a pressure signal for controlling the vertical deflection plates of the oscilloscope, switch $S_2$ is moved to position 1 to connect the output of multiplier 60 and amplifier 65 to the vertical deflection plates through line 83. Switch $S_1$ is moved to position 1 to supply a D.C. base to the multiplier so that its output is a function of the signal received from pressure transducer 63 which is proportional to the instantaneous pressure in the cylinder. Thus, a very accurate graphical representation of the pressure-volume relationship in the cylinder is obtained.

In addition to measuring the indicated horsepower of a cylinder and presenting a graphical picture of the pressure-volume relationship, the circuit described above can be used to measure the power losses occurring in the valves and piping associated with the cylinder. This is particularly desirable information in connection with compressors.

Figure 7:
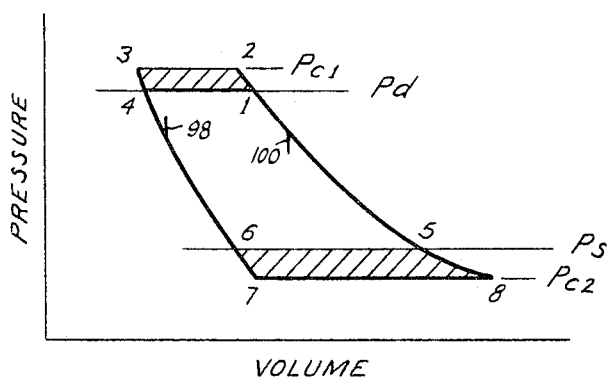
FIGS. 7 and 8 are typical pressure-volume diagrams of reciprocating piston type gas compressor with FIG. 7 indicating the power loss in the valves and piping associated with a cylinder in a compressor and FIG. 8 illustrating the capacity of the compressor.

FIG. 7 illustrates a typical pressure-volume diagram for a compressor. $P_{c1}$ is the pressure in the cylinder while the discharge valves are open, whereas $P_d$ is the discharge line downstream of the discharge valve. Thus, the area 1, 2, 3 and 4 represents the work per stroke lost because of the pressure drop through the discharge line and valve. Similarly, area 5, 6, 7 and 8 represents the work per stroke lost in the suction line and inlet valve of the cylinder with $P_{c2}$ being the pressure in the cylinder during the suction stroke and $P_s$ the pressure in the suction line. These areas multiplied by the speed of the compressor gives the power lost.

This measurement can be obtained in accordance with this invention by using a differential pressure transducer which will provide an electrical signal with an amplitude proportional to the pressure drop between the cylinder and some selected point in either the discharge or suction lines. A selected portion of this signal when multiplied with electrical signal $E_2$ from transducer 10, and integrated, will provide a signal proportional to the power lost.

Since these power losses occur only when either the suction or discharge valves are open, measurements are taken only during those portions of the cycle.

The portion of the cycle to be measured is selected by means of a gating circuit which includes gate generator 70, which controls relay driver 71 which in turn energizes relay 72 during a selected portion of the cycle. The relay 72 is spring loaded in the position shown in FIG. 5. When the relay 72 is not energized, the integrator 66 is connected to ground through relay 72, preventing the noise generated in the system or picked up from external sources providing an erroneous indication. With switch $S_2$ in position 2, and switch $S_3$ in position 2, power will be measured only when relay 72 is energized. Thus power can be measured during any selected portion of the cycle by controlling the times which relay 72 is energized and deenergized.

Figure 6:
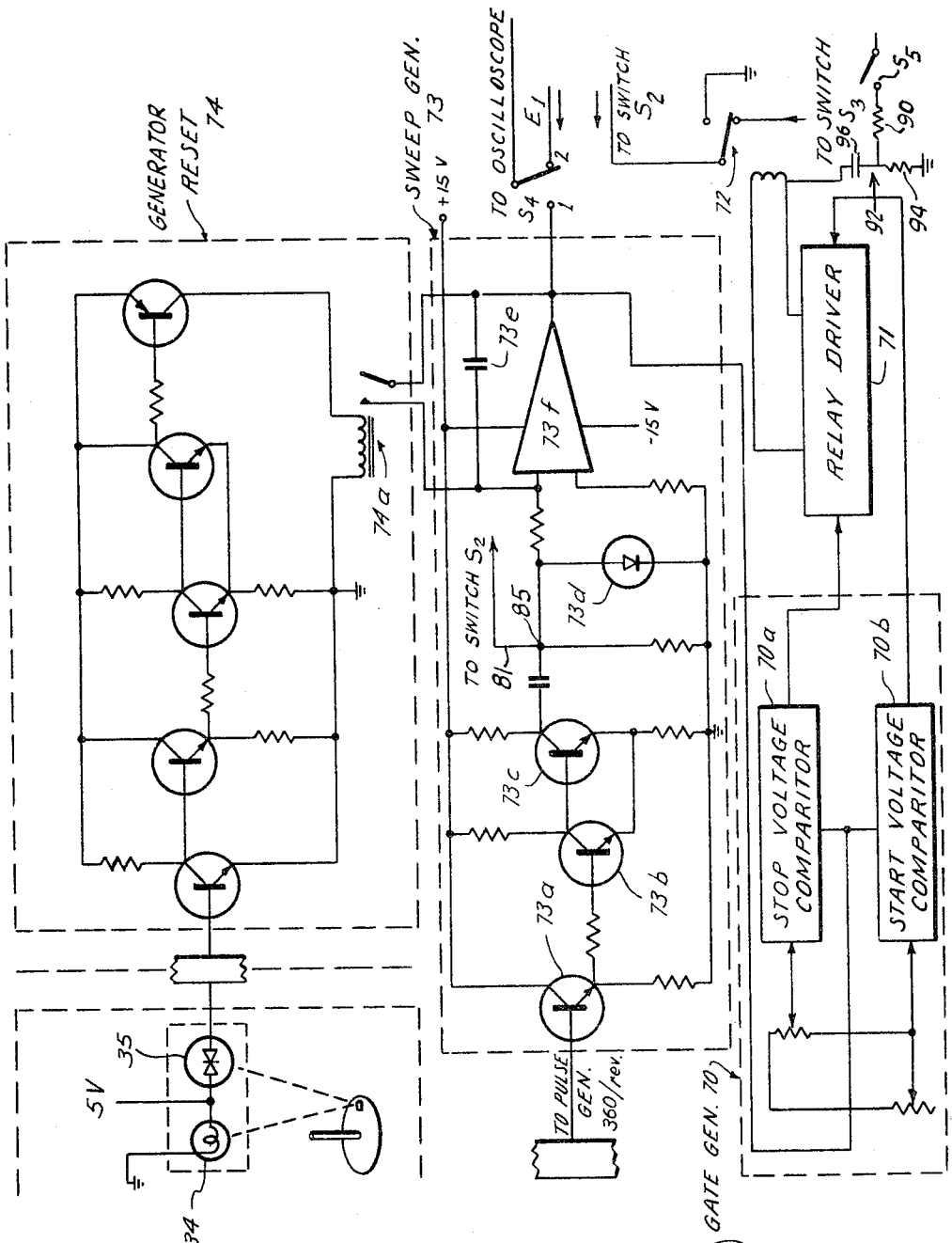
FIG. 6 is the electrical circuit employed to allow the power output of the machine to be measured during selected positions of the cycle.

FIG. 6 partially illustrates the circuitry of the gate circuit used to control relay 72. Besides the gate generator and relay driver, it includes sweep generator 73 and reset generator 74. The sweep generator provides the gate generator with voltage which increases in incremental steps as the piston travels through one cycle. This allows any portion of that signal between a minimum and maximum voltage to be passed by the gate generator to the relay driver to close relay 72. The maximum and minimum voltages between which the relay is closed are determined by the setting of the stop and start voltage comparators 70a and 70b.

In order to know the proper setting for the voltage comparators, a base line can be established on the oscilloscope representing line pressure and the voltage comparators set to gate only that portion of the P-V cycle having a pressure in excess or below the base line as the case may be. For example, assume the power loss is to be measured for the discharge valves. A signal representative of the difference between the discharge line pressure and the cylinder pressure is obtained from transducer 63 by connecting one of the transducer pressure inlets to sense the discharge line pressure and the other transducer inlet to sense the cylinder pressure. The vertical position for the oscilloscope trace with zero input voltage is determined and used as the base line. With switch $S_1$ in position 1 and switches $S_2$ and $S_3$ in their position 2, the pressure transducer signal $E_3$ is connected through the contacts of relay 72 to the oscilloscope vertical deflection circuits. The horizontal sweep of the oscilloscope is provided by setting switch $S_4$ in position 1. The portion of the pressure signal that is desired for power loss determination is that which occurs when the cylinder pressure is greater than the discharge line pressure. For this condition, the polarity of the pressure transducer output voltage will be opposite from the polarity when the reverse is true, i.e. when the cylinder pressure is less than the discharge line pressure. To properly set the gating interval, each of the comparators 70a and 70b is adjusted so that the relay 72 is energized for an interval such that the display of $E_3$ begins and ends exactly at the zero voltage base line previously established, with none of the $E_3$ signal appearing below the base line and none of it being cut off above the base line. Since the transducer output goes through zero at the end points of the desired measurement region, the comparators are now set to close relay 72 during that portion of the cycle from point 1 to point 4 in FIG. 7. If a total pressure transducer instead of a differential type is used to sense the cylinder pressure, a similar technique can be used, but the base line must be established by measurement or prior calibration to be that of the discharge line pressure and the pressure signal $E_3$ crossings of this base line used as the set points for the comparators 70a and 70b.

The discharge power losses can be determined in a similar manner by establishing the pressure base line on the oscilloscope using the suction line pressure.

In an alternative method for determining the proper setting of the voltage comparators, the oscilloscope is used to display the pressure-volume curve of the cylinder and signals generated when the relay 72 opens and closes. Thus, to set the generator for the desired portion of the cycle, as for example, to measure the power loss which occurs between the cylinder and the line into which it is discharging, the P-V diagram is presented on the oscilloscope in the same manner as described above, with switch $S_1$ in position 1, switch $S_2$ in position 1, and switch $S_3$ in position 2. Switch $S_5$ is closed, connecting one side of the coil of relay 72 to the vertical control plates of oscilloscope 75 through a current limiting resistor 90 and a differentiating network 92 consisting of resistor 94 and capacitor 96. Output signal $E_1$ from transducer 10 is, of course, connected to the horizontal control plates of oscilloscope 75 by line 76 and 77 with switch $S_4$ in position 2. When a signal is applied to the coil of relay 72 by relay driver 71, the leading edge of the signal from the relay driver 71 is differentiated by the network 92, producing a pulse 100 (FIG. 7) which can be observed on the oscilloscope trace. The pulse 100 indicates that the relay 72 has been energized. At the end of the pulse produced by the relay driver, the trailing edge of the pulse is differentiated and displayed by the oscilloscope as pulse 98. Pulse 98 indicates that the relay 72 has become de-energized.

With this graphical representation of the opening and closing of the relay in relation to the piston cycle as represented by the P-V diagram, the voltage comparators 70a and 70b of gate generator 70 can be adjusted to cause the relay 72 to be energized during any selected portion of the cycle. For example, to measure the discharge power loss, the voltage comparators of gate generator 70 would be set to cause the relay 72 to be energized during that portion of the cycle between points 1 and 4 of FIG. 7. After setting the voltage comparators, the switch $S_1$ is placed in position 2, and switch $S_2$ is placed in position 2. Thereafter, relay 72 controls the signal $E_4$ from amplifier 65, and the meter 67 will indicate the discharge power losses since the signal is applied to the integrator 66 from amplifier 65 only during that portion of the cycle between points 1 and 4.

The pressure transducer, of course, will be of the differential type and connected to indicate the difference in pressure between the cylinder and the discharge line when this power loss measurement is desired. This differential transducer could consist of two individual presure transducers connected in such a way as to indicate the difference in pressure.

As stated above, sweep generator 73 provides the gate generator with a voltage which increases incrementally as the piston travels through one cycle. It includes (FIG. 6) transistors 73a, 73b and 73c which are arranged with various resistors to receive the impulses from pulse generator 43 and shape them so they are of uniform width. The Zener diode 73d then provides the impulses with a uniform height and they are in the proper form to be stored by capacitor 73e and cause an incrementally increasing voltage to be transmitted by amplifier 73f to gate generator 70.

So that this voltage build-up will start and stop at the beginning and end of each cycle of the piston, reset generator 74 is provided to discharge capacitor 73e at the end of each cycle of the piston. The reset generator is triggered by the pulse produced by photoelectric cell 35 once each revolution of the crankshaft and should be synchronized with the piston so that it triggers the reset generator at top dead center.

In operation, the reset generator amplifies the impulse received and closes relay 74a thereby discharging capacitor 73e.

The sweep generator output can also be used to control the horizontal sweep of the oscilloscope when it is desired to graphically present the relationship of cylinder pressure and shaft position. In the instrument illustrated in FIG. 5 when this is desired, switch $S_4$ is moved to position 1.

The capacity of a compressor cylinder can also be measured with the instrument illustrated in FIG. 5. The capacity of a compressor is usually expressed in terms of the amount of gas delivered per unit of time.

The amount of gas, M, delivered to the discharge line of a compressor is equal to the amount of gas in the cylinder before the discharge valve opens, $M_1$, minus the amount of gas, $M_2$, in the cylinder when the discharge valve again closes. The amount of gas delivered per stroke is $$M = M_1 - M_2 = \frac{P_1 V_1}{R T_1} - \frac{P_2 V_2}{R T_2}$$

Figure 8:
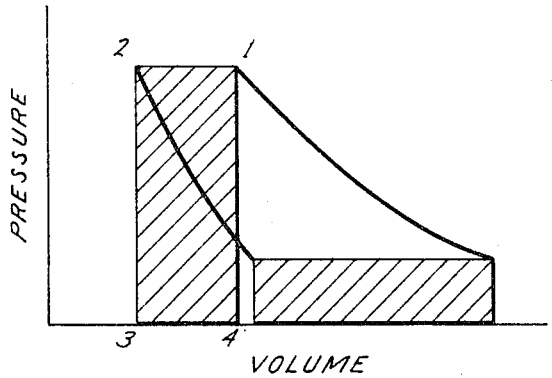

If the conditions are selected such that at $V_1$ and $V_2$ $$\frac{P_1}{RT_1} = \frac{P_2}{RT_2}$$

then $$M = \frac{1}{R}\int_{V_1}^{V_2}\left(\frac{P}{T}\right)dV$$

and the capacity is shown in FIG. 8 as enclosed by the curve 1, 2, 3 4. In practice the temperature T cannot be easily sensed with the speed necessary for the above computation to be practical. In the described instrument the pressure Pd is fixed at the average of the line pressure at the time the discharge valves open and close and the line discharge temperature is used. These quantities, P and T, are set to a fixed value corresponding to the discharge line pressure and temperature that exist for a particular test. When multiplied by the engine speed, $\omega$, the capacity, Q, expressed in mass per unit time is $$Q\frac{P\omega}{RT}\int_{V_1}^{V_2}dVdV = \frac{P\omega}{RT}\int_{\theta_1}^{\theta_2}\cos\theta d\theta = \frac{P\omega}{RT}\int_{t_1}^{t_2}\cos\omega t dt$$

For capacity measurement the instrument is the same as for power loss measurement except that both switches $S_1$ and $S_3$ are in position 1 and switch $S_2$ is in position 2. In this case the shaft rotation transducer output signal $E_2$ is connected through potentiometers 80 and 80a to the integrator input through the relay 72. The potentiometers are set to provide a proportion of the voltage $E_2$ equivalent to P and T at the discharge line of the cylinder under test. The output of integrating circuit 66 is then in terms of capacity when the gate circuit has been properly adjusted to close relay 72 during that portion of the cycle that the discharge valve is open. It will be noted that the capacity indicated will be for the discharge temperature and pressure prevailing. Also, the relay can be closed at other points along the P-V curve and an indication of capacity can be obtained by setting the potentiometer 80 to produce a voltage representing the equivalent pressure at the point where the relay 72 is energized and de-energized. For more accuracy the potentiometer 80a should be set to a position representing the temperature at the same points on the curve. When pressure alone is used, it should, of course, be corrected for temperature if it is desired to indicate capacity under standard conditions. This can be accomplished in the same manner as described above in connection with measuring power losses. Replacing the two potentiometers 80 and 80a by a single potentiometer, which would set in the ratio $P/T$, is a variation that is considered to be within the scope of this invention.

For convenience, meter 67 can be provided with a properly calibrated dial to read capacity directly in the desired units. For example, the meter can be calibrated to read in cubic feet per minute at standard conditions.

It is often desirable to know the speed at which the crankshaft is turning. In the instrument illustrated in FIG. 5, this information can also be read on meter 67 by moving switch $S_2$ to position 3 to thereby connect the point 85 (FIG. 6) to integrating circuit 66 through line 81. The pulses produced at the point 81 are of uniform height and width, causing the signal produced at the output of the integrating circuit 66 to vary directly as a function of the frequency of the pulses. Here again, meter 67 can be provided with an appropriate dial for indicating crankshaft speed directly or its reading can be converted by multiplying it by the appropriate constant.

The one pulse per revolution is used, in addition to resetting the sweep generator, to fire timing light 82. This light is used to show the position of the transducer input shaft 18 to the crankshaft. Thus, timing light 82 is used to position inner housing 12 of transducer 10 so the signal produced thereby is synchronized with the cylinder under test.

Transducer 10 can be directly connected to the crankshaft of the machine under test or it can be driven by other means such as servo motors, etc.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for measuring the indicated power of a piston reciprocating in a cylinder, comprising means for producing a first electrical signal proportional to the product of the fundamental of the piston motion and the speed of the piston and a second electrical signal proportional to the product of the second harmonic of the piston motion and the speed of the piston; means for summing said first and second signals to produce a third electrical signal proportional to the first derivative of the instantaneous volume of the cylinder; means for producing a fourth electrical signal proportional to the instantaneous pressure in the cylinder; means for multiplying the third signal by the fourth signal to produce a fifth signal; and means for integrating the fifth signal to produce a sixth electrical signal proportional to the indicated power of the piston.

2. Apparatus for measuring the indicated power of a piston reciprocating in a cylinder and connected to a crankshaft by a piston rod, comprising means for producing a first electrical signal proportional to the fundamental of the piston motion and a second signal proportional to at least one of the higher order even harmonics of the piston motion; means for summing said first and second signals to produce a third signal proportional to the first derivative of the instantaneous volume of the cylinder; means for producing a fourth electrical signal proportional to the instantaneous pressure in the cylinder; means for producing a signal porportional to the speed of the crankshaft; means for multiplying the signals thus obtained to provide a fifth signal; and means for integrating the fifth signal to produce a sixth signal proportional to the indicated power of the piston.

3. Apparatus for producing an electrical signal proportional to the instantaneous volume of a cylinder having a piston reciprocating therein responsive to turning of a shaft, comprising rotary means adapted to be driven by the shaft to produce a rotary motion; means for transforming said rotary motion into a first electrical signal having a frequency equal to the frequency of reciprocation of the piston; means for transforming said rotary motion into a second electrical signal having a frequency twice that of the first signal and an amplitude and phase angle relative to the first signal, that it represents the second harmonic of the piston's motion; and means for adding the first and second signals to produce a third signal proportional to the instantaneous volume of the cylinder.

4. Apparatus for producing an electrical signal whose amplitude is proportional to the first derivative with respect to time of the instaneous volume of a cylinder above a reciprocating piston connected to a crankshaft by a piston rod, comprising means for transforming the rotary motion of the crankshaft into producing a first signal having a frequency equal to the speed of rotation of the crankshaft and a phase relative to the crankshaft to be of zero amplitude when the piston is at dead center, and also a second electrical signal having a frequency equal to twice the frequency of the first signal and an amplitude and phase angle relative to the first signal such that it varies in accordance with the second harmonic of the motion imparted to the piston by the piston rod; and means for adding the two electrical signals to produce a third electrical signal proportional to the first derivative of the instantaneous volume of the cylinder above the reciprocating piston.

5. The apparatus of claim 4 in which the first and second electrical signals are respectively produced by first and second resolvers each having a rotating winding and a stationary winding with one winding being supplied with a direct current of constant amplitude to provide a uniform magnetic field whereby the amplitude of the signal produced by each resolver is proportional to the product of the cosine of the crankshaft position and the speed of the crankshaft.

6. The apparatus of claim 5 further provided with means for adjusting the amplitude of the direct current being supplied the winding of the second resolver producing the second signal and means for adjusting the relative phase angle of the outputs of the resolvers.

7. Apparatus for measuring the indicated horsepower of a piston reciprocating in a cylinder and driven by a crankshaft, comprising means for producing a first electrical signal having a frequency equal to the crankshaft speed and an instantaneous amplitude proportional to the product of the cosine of the crankshaft position and the speed of the crankshaft and a second electrical signal having a frequency twice that of the first signal and an amplitude and phase angle such that it represents the second harmonic of the motion imparted to the piston by the crankshaft; means for combining the first and second signals to obtain a third signal proportional to the first derivative of the instantaneous volume of the cylinder; means for producing a fourth signal which is proportional to the instantaneous pressure in the cylinder above the piston; means for multiplying the third signal by the fourth signal to obtain a fifth signal; means for integrating the fifth signal to obtain a sixth signal proportional to the power being exterted on the piston in the cylinder; and means for reading the value of the sixth signal to determine the power being exerted on the piston.

8. The apparatus of claim 7 in which the first and second signals are produced by two resolvers, each resolver having a first winding supplied with a direct current and a second winding adapted to rotate within the magnetic field produced by the first winding; means for adjusting the relative amplitude of at least one of the output signals of the resolvers; and means for adjusting the phase angle of the output signal of one resolver relative to the output signal of the other.

9. Apparatus for measuring the loss of power caused by the pressure drop through valves and piping associated with a cylinder of a reciprocating piston type machine, the cylinder having a piston therein connected to a rotating crankshaft by a rod, comprising means for producing a first electrical signal proportional to the fundamental of the motion imparted to the piston by the crankshaft through the rod; means for producing a second electrical signal proportional to the second harmonic of the motion imparted to the piston by the crankshaft through the rod; means for combining the first and second signals to obtain a third signal proportional to the instantaneous volume of the cylinder above the piston, the phase angle of the third signal with respect to the crankshaft being such that the amplitude of the third signal is zero when the piston is at dead center; means for producing a fourth electrical signal proportional to the pressure differential between two selected points in the cylinder and the associated piping; means for multiplying the third and fourth signals to produce a fifth signal; means for integrating the fifth signal to produce a sixth signal having an amplitude proportional to the power being lost; and gating means for causing the fifth signal to flow to the integrating means during that portion of the cycle of the piston where flow is occurring between the selected points.

10. The apparatus of claim 9 in which the first and second signals are each produced by a resolver having a rotating winding and stationary winding with the winding being supplied with a direct current whereby the amplitudes of the signal produced is proportional to the product of the cosine of the shaft position and the speed of the crankshaft.

11. The apparatus of claim 10 further provided with means for adjusting the phase angle between the output signals of the resolvers.

12. Apparatus for measuring the capacity of a cylinder of a reciprocating piston compressor having a piston therein connected to a crankshaft comprising means for producing a first electrical signal proportional to the fundamental of the motion imparted to the piston by the crankshaft; means for producing a second electrical signal proportional to the second harmonic of the motion imparted to the piston by the crankshaft; means for combining the first and second signals to obtain a third signal; said third signal having a phase angle relative to the crankshaft such that its amplitude is zero when the piston is at dead center so that the third signal is proportional to the first derivative of the instantaneous volume of the cylinder above the piston; means for adjusting the third signal in proportion to the average of the pressures in the cylinder during the portion of the cycle that fluid is flowing into or out of the cylinder by the piston to provide a fourth signal; means for integrating the fourth signal to obtain a signal whose amplitude is proportional to the capacity of the compressor; and gate means for causing the fourth signal to flow to the integrating means only when fluid is flowing into or out of the cylinder.

13. The apparatus of claim 12 in which means are provided for adjusting the third signal in proportion to the temperature of the fluid flowing into or out of the cylinder.

14. The apparatus of claim 13 in which the first and second signals are each produced by a resolver having a rotating winding and a stationary winding with one winding being supplied with a direct current whereby the amplitude of the signals produced are proportional to the cosine of the crankshaft position and the speed of the crankshaft.

15. The apparatus of claim 14 further provided with means for adjusting the phase angle between the output signals of the resolvers.

16. A transducer for providing a first electrical signal proportional to the instantaneous volume of a cylinder having a piston reciprocated therein by a crankshaft and a second signal proportional to the first derivative with respect to time of the instantaneous volume of said cylinder, comprising first and second resolvers each having a rotor and also windings arranged to produce electrical signals 90° out of phase with each other upon rotation of the rotor; means for rotating the rotor of the first resolver at the fundamental frequency of the piston and the rotor of the second resolver at twice the fundamental frequency of the piston to thereby produce from each resolver a first signal proportional to the product of the sine of the crankshaft position and the crankshaft speed and a second signal proportional to the product of the cosine of the shaft position and the shaft speed; and means for adding the first and second signals from each resolver.

17. The method of producing an electrical signal proportional to the instantaneous volume of the cylinder having a piston reciprocated therein by a crankshaft, comprising generating a first sinusoidal electrical signal, controlling the frequency of said first signal so that it equals the crankshaft speed, generating a second sinusoidal electrical signal, controlling the frequency of the second signal so that it equals twice the crankshaft speed, controlling the amplitude and phase angle of the second signal relative to the first signal such that it is proportional to the second harmonic of the piston motion; adding the two signals together to obtain a third signal, and controlling the phase angle of the third signal relative to the crankshaft to be such that the amplitude of the third signal is at a maximum when the piston is at dead center.

18. The method of producing an electrical signal proportional to the first derivative of the instantaneous volume of a cylinder having a piston reciprocated therein by a crankshaft, comprising, generating a first sinusoidal electrical signal, controlling the frequency of the first signal to be equal to the crankshaft speed; generating a second sinusoidal electrical signal, controlling the frequency of the second signal to be equal to twice the crankshaft speed, controlling the amplitude and phase angle of the second signal relative to the first such that it is proportional to the second harmonic of the piston motion; adding the two signals together to obtain a third signal and controlling the phase angle of the third signal relative to the crankshaft to be such that it is of zero amplitude when the piston is at dead center.

19. The method of measuring the power being exerted on a piston reciprocating in a cylinder which is periodically filled with gas under pressure, the piston being connected to a crankshaft by means of an articulating rod, comprising, generating a first electrical signal proportional to the product of the crankshaft speed and the first derivative of the fundamental of the piston motion, and a second electrical signal proportional to the product of crankshaft speed and the first derivative of the second harmonic of the piston motion and having a phase angle relative to the first equal to the phase angle relationship of the fundamental and second harmonic of the piston; combining the two signals, generating a third signal which is proportional to the instantaneous pressure in the cylinder; multiplying the third signal with the signal obtained by the combination of the first and second signals to produce a fourth signal; and integrating the fourth signal to obtain a signal proportional to the power being exerted on the piston in the cylinder.

20. The method of measuring the power losses occurring in the valves and piping associated with a cylinder having a piston reciprocated therein by a crankshaft, comprising, generating a first sinusoidal electrical signal proportional to the product of the crankshaft speed and the first derivative of the fundamental of the piston motion and a second sinusoidal electrical signal proportional to the product of crankshaft speed and the first derivative of the second harmonic of the piston motion and having a phase angle relative to the first equal to the phase angle relationship of the fundamental and second harmonic of the reciprocating piston; adding the two signals together; generating a third signal which is proportional to the pressure differential existing between selected points in the cylinder and the piping associated with the cylinder; multiplying the third signal with the signal obtained by the summation of the first and second signals to produce a fourth signal during that portion of the cycle that the power loss is occurring; and integrating the fourth signal to obtain a signal proportional to the power being lost between the two points of measurement.

21. The method of measuring the capacity of the cylinder of a gas compressor having a piston therein connected to a crankshaft with a piston rod comprising, generating a first sinusoidal electrical signal proportional to the product of the crankshaft speed and the first derivative of the fundamental of the piston motion and a second sinusoidal electrical signal proportional to the product of crankshaft speed and the first derivative of the second harmonic of the piston motion and having a phase angle relative to the first equal to the phase angle relationship of the fundamental and second harmonic of the piston; adding the two signals together to obtain a third signal; multiplying the signal obtained by a constant equal to the ratio of the average pressure in the cylinder divided by the temperature of the gas to obtain a fourth signal; and integrating the fourth signal during the portion of the cycle that gas is being discharged from the cylinder to obtain a fifth signal proportional to the capacity of the compressor.

References Cited by the Examiner

UNITED STATES PATENTS

| | | | |
|---|---|---|---|
| 1,159,769 | 11/1915 | Hollstein | 73—115 |
| 2,478,973 | 8/1949 | Mahren | 235—197 X |
| 2,595,425 | 5/1952 | Thomson et al. | 73—116 X |
| 2,817,966 | 12/1957 | Wright et al. | 73—116 |

RICHARD C. QUEISSER, *Primary Examiner.*

JAMES J. GILL, *Examiner.*

J. W. MYRACLE, *Assistant Examiner.*